United States Patent [19]

Burckhardt

[11] Patent Number: 5,183,047
[45] Date of Patent: Feb. 2, 1993

[54] DOPPLER FLOW VELOCITY METER
[75] Inventor: Christoph B. Burckhardt, Muttenz, Switzerland
[73] Assignee: Kontron Instruments Holdings NV, Curacao, Netherlands Antilles
[21] Appl. No.: 697,892
[22] Filed: May 9, 1991
[30] Foreign Application Priority Data
May 21, 1990 [CH] Switzerland .......................... 1720/90
[51] Int. Cl.$^5$ .............................................. A61B 8/06
[52] U.S. Cl. ................................................ 128/661.09
[58] Field of Search ................ 73/861.25; 128/661.08, 128/662.05-662.06, 661.09

[56] References Cited
U.S. PATENT DOCUMENTS

| 4,966,153 | 10/1990 | Nakamura et al. | 128/661.09 |
| 4,979,513 | 12/1990 | Sakai et al. | 128/661.09 |
| 5,035,245 | 7/1991 | Nakamura et al. | 128/661.09 |
| 5,046,500 | 9/1991 | Fehr | 128/661.09 |

Primary Examiner—Francis Jaworski
Attorney, Agent, or Firm—Morgan & Finnegan

[57] ABSTRACT

Doppler Flow Velocity Meter for the irradiation of a fluid with pulses of ultrasonic waves which are fed at a predetermined pulse repetition frequency, and for the reception of echo waves reflected by fluid particles and to emit corresponding echo signals; and having receiver connected to an ultrasonic transducer for the reception and processing of echo signals which correspond to at least two different echo waves, which are reflected by the particles in a fixed point of the flow path in response to a first and a second wave pulse emitted, in which the adjacent but separate frequency bands of the echo signal are each processed in a separate signal processing channel;

The receiver containing a portion in each of the signal processing channels for carrying out a quadrature demodulation of the echo signals received from the ultrasonic transducer in each of the frequency bands, in which at the output of channels a couple of each of the quadrature signals can be obtained which define a complex measured value at each time ($P(0)$, $P(\Delta t)$, $P(2\Delta t)$, ... );

a portion in which a first output signal can be produced from the quadrature signals which corresponds to an average value of the flow velocity in the analyzed point of the flow path;

a portion for the logical correlation of the first output signal with the quadrature signals at the output of one of the signal processing channels, in which signals can be produced which define complex calculated values ($P(\Delta t/2)$, $P(3\Delta t/2)$, ... ), and a portion for evaluation such that information on the instantaneous value of the flow velocity is obtained over a broadened measuring range.

9 Claims, 14 Drawing Sheets

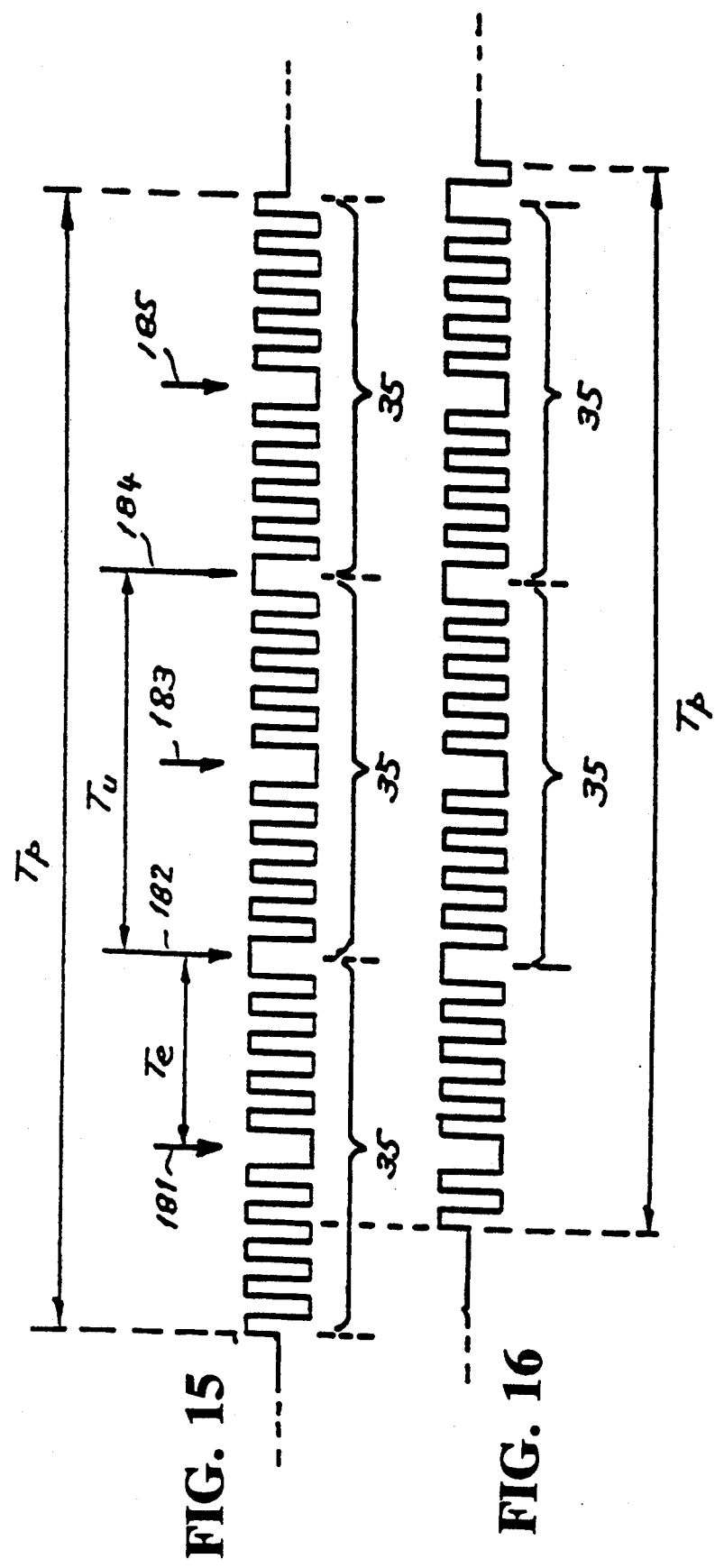

DOPPLER FLOW VELOCITY METER

TECHNICAL FIELD OF THE INVENTION

The present invention relates to a Doppler measuring device for measuring flow velocity of a fluid carrying particles which reflect ultrasonic waves.

BACKGROUND OF THE INVENTION

A Doppler flow velocity meter may include:
(a) an ultrasonic transducer for the radiation of fluid with ultrasonic wave pulses in response to corresponding transmit pulses which are fed to it with a predetermined pulse repetition rate, for receiving echo signals reflected in the fluid by the particles and for the emission of corresponding echo signals; b) a transmitter linked to the ultrasonic transducer for the production of transmit pulses which excite the ultrasonic transducer to emit ultrasonic wave pulses; (c) a receiver connected to the ultrasonic transducer for receiving and processing echo signals which correspond to at least two different echo waves which are reflected by the particles in a set point of the flow path in response to a first and a second pulse of the transmitted wave, in which adjacent but separate frequency bands of the echo signals are each processed in a separate signal processing channel; (d) an evaluator unit connected to the receiver output, by which an output signal is derived from the Doppler information obtained with the receiver, this signal corresponding to the flow velocity.

By a pulsed Doppler procedure the flow velocity of a fluid, for example, blood carrying particles which reflect ultrasonic waves is measured in an element of determined set volume. In this procedure, a series of ultrasonic pulses are transmitted by a transducer. Each time, at a time $\tau$ after the transmit pulse, a receiving gate is opened for a brief time for which, $$\tau = 2\,d/c, \tag{1}$$

in which d is the distance to the volume element and c the sound velocity. Thus a succession of brief reception signals is obtained. These are now processed by suitable electronic means into a continuous Doppler signal. The frequency of this Doppler signal gives the flow point velocity v according to known formula $$v = -(f_D \cdot c)/(2 f_1 \cos \theta) \tag{2}$$

in which $f_D$ is the Doppler frequency, c sound velocity, $f_1$ the frequency of the ultrasonic signal transmitted and $\theta$ the angle between the sound radius and the direction of velocity. In this respect one must take care that the Doppler frequency $f_D$ is the difference between the frequency of the signal received and the frequency of the signal transmitted.

Generally a fast Fourier transformation of the Doppler signal is carried out. With this the distribution of flow velocity as a function of time is determined.

In the pulsed Doppler process the echo signal is periodically analysed, that is to say that it is measured only in periodic rest points. According to the Nyquist theorem therefore the maximum univocally measurable Doppler frequency and thus the maximum univocally measurable velocity are limited.

The value of the maximum univocally measurable flow velocity can be determined with the following formula $$|v_{max}| = (c^2)/(8 f_1 d \cos \theta) \tag{3}$$

In this formula c is the velocity of sound, $f_1$ the ultrasonic frequency, d the depth and $\theta$ the angle between the sonic radius and the direction of the velocity. With this formula one can calculate for example for d=15 cm, $\theta$=0, $f_1$=3 MHz and c=1540 m/sec and c=1540 m/sec the value $v_{max}$=0.66 m/sec. In practice higher velocities are often obtained. These higher velocities are curved ("alias" distortion), which is to say that these are represented as lower velocities or as velocity with an opposite direction. This is a serious disadvantage of this procedure.

In order to widen the measuring range of the point flow velocity, that can be measured univocally with a pulsed Doppler process, the following measures are taken. All these measures however have certain disadvantages.

1. Choice of an emission frequency less than $f_1$:

As is shown by equation (3), $V_{max}$ becomes larger. Consequently however the space resolution and the sensitivity of the procedure are reduced, because at lower frequency less power is redispersed. In practice therefore the lower frequency limit employed is at about 2 MHz.

2. Baseline shift

The normal measuring range lies between $-V_{max}$ and $+V_{max}$. By means of a simple variation of the evaluator it is possible to shift this measuring range, for example, in such a way that it is measured between 0 and 2 $v_{max}$. This is however useful only if exclusively positive velocities result. By this means only a shift is obtained and not a broadening of the measuring range.

3. Increase in Pulse Succession Frequency

By means of an increase in the frequency of the pulse series and therefore the analysis rate beyond the normal levels, an increase in the maximum measurable velocity is obtained. The disadvantage of this method is that echo signals from undesired volume elements are also obtained, which are on the outside of the desired volume element to be realised. The undesired volume elements are nearer to the transducer than the desired volume element is and therefore they produce stronger echo signals that disturb the reception of the desired echo signal.

The procedures or measures indicated in points 1 to 3 are all used in practice, which demonstrates that none of these represents a completely satisfactory solution.

Subsequently and also known is a fourth procedure which however is not used in practice.

4. Tracking Doppler Process

In this procedure one determines when the velocity exceeds the Nyquist limits and then a multiple of the velocity $V_{max}$ is added which is defined by equation (3). The main problem in this procedure is that of reliably determining which Nyquist range one is in. This procedure is not therefore used in practice.

For determining the average value $V_a$ of the flow velocity a so-called two frequency procedure is known which allows an increase of the measuring range with a pulse Doppler method for measuring the flow velocity (see U.S. Pat. No. 4,534,357). In this known two frequency method adjacent but separate echo signal frequency bands are processed in a separate signal processing channel. The highest value $V_{a\,max}$ which can be determined by means of this method amounts to:

$$v_{a\,max} = (c^2)/(8(f_2-f_1)\,d\cos\theta) \quad (4)$$

where $f_1$ and $f_2$ are the average frequencies of the frequency band.

The other symbols are the same as equation (3). Since $(f_2-f_1) < f_0$, the maximum measurable velocity $V_{a\,max}$ of a two frequency method is greater than the $V_{max}$ defined by equation (3).

It is important to establish the following difference between the two frequency method just described and the other aforementioned pulsed Doppler procedures described previously:

Using the cited two frequency procedure an average flow velocity value is determined from few measuring points typically from 4 to 8. This method is therefore especially suitable for tracing a colour flow map.

In the other pulsed Doppler methods which have been described above, a spectrum is determined with a relatively large number of measurement points which are typically from 64 up to 256 measuring points. Here therefore substantially more detailed information on the velocity distribution as a function of time is obtained, but more measuring points are also required and thus more time. These methods are therefore utilised for measuring flow velocity in a single volume element.

The object of the present invention is that of providing a Doppler meter of the aforementioned type, by which measurement of the time distribution of flow velocity can be carried out, in which the measurement range where the flow velocity is univocally measured, is notably broadened.

For the solution of this problem a Doppler meter of the aforementioned type according to the present invention is characterised in that (e) the receiver contains the following means:

e.1) means comprised in each of the signal processing channels for the realisation of a demodulation of quadrature of the echo signals received from the ultrasonic transducer in each of the frequency bands, by which at the output of each of the signal processing channels a couple of quadrature signals are obtained each time defining a complex measured value $(P(0), P(\Delta t), P(2\Delta t) \ldots)$;

e.2) Means for the processing of quadrature signals coming from both signal channels, whereby, by these means a first output signal can be obtained which corresponds to an average flow velocity value in the point analysed in the course of the flow;

e.3) Means for the logical correlation of the first output signal with the quadrature signal at the output of one of the signal processing channels, in that, by means of this correlation, signals can be obtained which define complex calculated values of $(P(\Delta t/2), P(3\Delta t/2), \ldots)$ which are consistent with the average flow velocity determined and with measured measurement values; and e.4) Means for the evaluation of a signal sequence composed of signals corresponding to complex measured and calculated values $(P(0), P(\Delta t/2), P(\Delta t), P(3\Delta t/2), P(2\Delta t), \ldots)$, whereby, by this evaluation, information is obtained on the instantaneous flow velocity value.

The solution according to the present invention with a meter device of the aforementioned kind allows the abovementioned disadvantages of the methods known up to now for increasing the flow velocity measurement range to be eliminated.

In one preferred embodiment the transmitter is set up so that the sequence spectrum of the periodic sequence of the transmit pulses consists of two adjacent but separate frequency bands.

The means for the evaluation of the signal sequence preferably contains means for carrying out analysis of a signal sequence which is composed of signals corresponding to complex measured and calculated values, $(P(0), P(\Delta t/2), P(\Delta t), P(3\Delta t/2), P(2\Delta t), \ldots)$ in which by these analyses a second output signal is produced the amplitude of which corresponds to the phase variation of an indicator defined by signals of the signal sequence and therefore corresponds to the instantaneous value of the flow velocity.

BRIEF DESCRIPTION OF THE DRAWINGS

The objects of the invention are described herein with reference to the attached drawings, in which:

FIGS. 15 and 16 show transmit pulses; and

DETAILED DESCRIPTION OF THE INVENTION

Description of the Principle Structure

Figure 1:
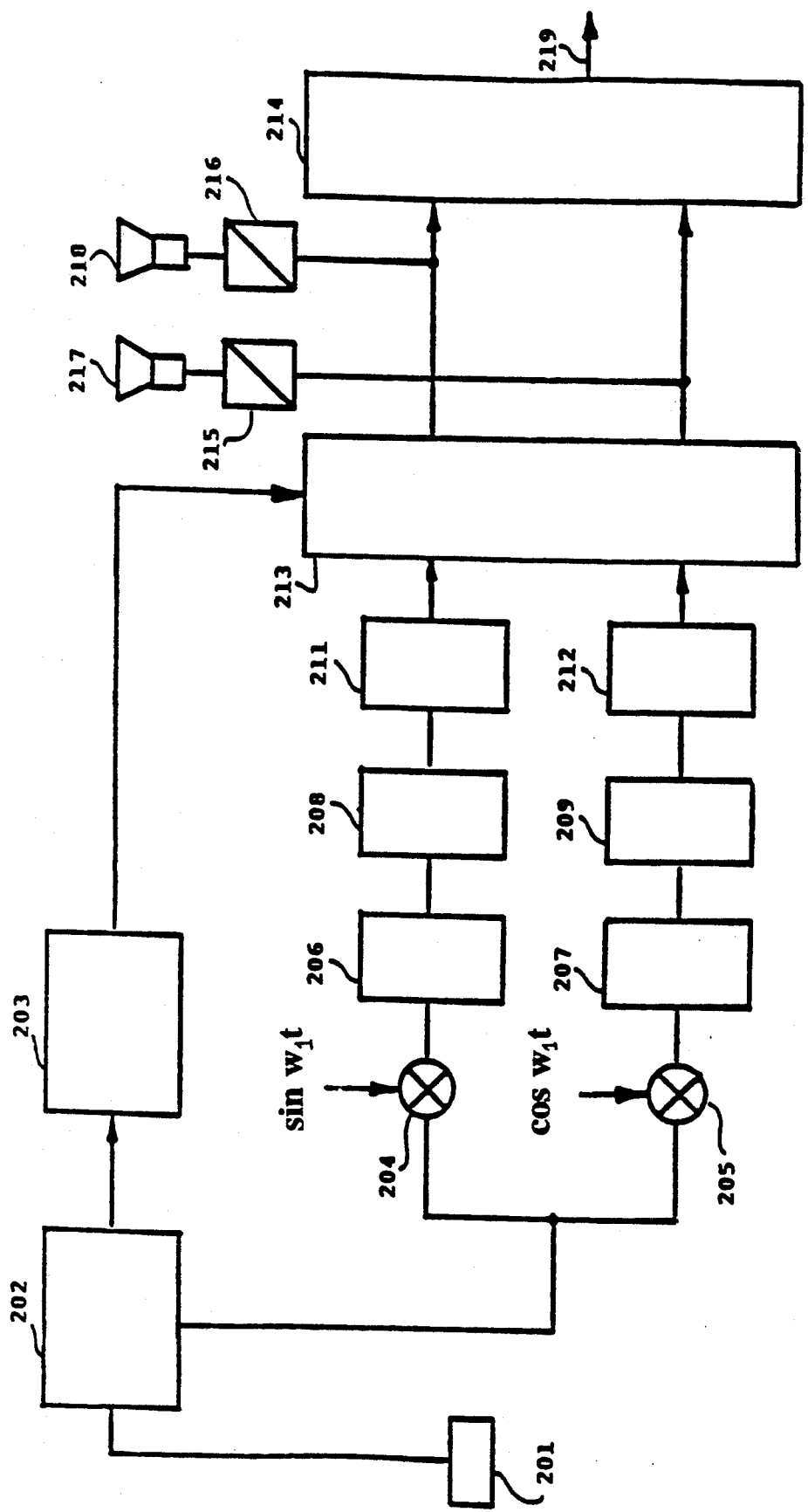
FIG. 1 shows a block diagram representing the principle structure of a Doppler flow velocity meter according to the present invention.

FIG. 1 shows a very simplified block diagram which represents the principle structure of a Doppler velocity meter according to the present invention. An ultrasonic transducer 201 connected to a receiving transmitter 202 sends transmit pulses having a spectrum consisting of two adjacent but separate frequency bands. These transmit pulses and devices for producing them are described in full detail making reference to FIGS. 7 to 17. The arrangement in FIG. 1 has two separate channels for processing the echo signals received. In the upper channel which is formed by a circuit 203, echo signals are processed in the two frequency bands of transmit pulses and at the output of this channel an output signal is obtained which corresponds to an average value of the flow velocity in an analysed point of the flow's path. This average value has an upper limit $v_{a\ max}$ which is given in equation 4. With the circuit 203, therefore, an average value of the flow velocity is measurable in a greater measurement range with respect to conventional Doppler procedures. For the determination of the average value $v_a$ of the flow velocity in an analysed point of the flow's path, echo signals from 4 to 8 transmitted pulses (which is more than sufficient) are processed in the usual way.

The lower channel in FIG. 1 is a conventional pulsed Doppler channel at the frequency $f_1$ consisting of two quadrature demodulators 204 and 205 which mix the signal with the signals of the form $\sin \omega_1 t$ and $\cos \omega_1 t$ with successive low pass filters 206, 207, integrator and holding circuits 208, 209 which analyse the signal at the desired time and successive fixed echo erasers 211, 212 for the elimination of stationary and almost stationary echo signals. At the output of the fixed echo eraser 211 a quadrature signal $a(t)$ is transmitted, and a quadrature signal $b(t)$ is transmitted from the output of the fixed echo eraser 212. The signals $a(t)$ and $b(t)$ are continuous signals. For the subsequent analysis however only the values of these signals at the times in which the signal is determined must be considered. These times are 0, $\Delta t$, $2\Delta t$ and therefore have the signal values $$a(0), a(\Delta t), a(2\Delta t), a(3\Delta t) \quad (5a)$$

$$b(0), b(\Delta t), b(2\Delta t), b(3\Delta t) \quad (5b)$$

in which $\Delta t$ is the time between transmit pulses, $a(k\Delta t)$ and $b(k\Delta t)$ are measured values. These values can be considered as the real and imaginary parts of the complex signal $$P(k\Delta t) = a(k\Delta t) + jb(k\Delta t)$$

Pairs of successive signals $a(k\Delta t)$, $b(k\Delta t)$ thus each time define a complex measured value of $P(0)$, $P(\Delta t)$, $P(2\Delta t) + P(3\Delta t)$ The velocity values can be derived from the phase variation p which with time have the normal higher velocity limit $v_{max}$ according to equation (3).

According to the present invention the output signal of the computer unit 203 and the signals $a(k\Delta t)$ and $b(k\Delta t)$ are fed to the outputs of the fixed echo erasers 211 and 212, inputs of the computer unit 213. These signals are logically correlated in the computer unit 213 to obtain calculated values of signal pairs $a'(k\Delta t/2)$, $b'(k\Delta t/2)$ by interpolation which define complex calculated values $P(\Delta t/2)$, $P(3\Delta t/2)$, $P(5\Delta t/2)$; for these values the following equation is valid:

$$P(K\Delta t/2) = a'(k\Delta t/2) + jb'(k\Delta t/2)$$

The values $a'(k\Delta t/2)$, $b'(k\Delta t/2)$ are consistent with the average value $v_a$ of the flow velocity determined by the output signal of the computer unit 203 and with the measured values $a(k\Delta t)$, $b(k\Delta t)$ of the signals at the output of the constant sign erasers 211, 212. Between the successive pairs of signals, the measured values $a(k\Delta t)$, $b(k\Delta t)$ correspond, for example in the computer unit 213 one can produce a pair of signals $a'(k\Delta t/2)$, $b'(k\Delta t/2)$ which correspond to values calculated by interpolation. In the computer unit 213 two or more of these interpolated values can also be calculated between successive measured values. If two interpolated values are calculated, then the corresponding pairs of signals are $a'(k\Delta t/3)$, $b'(k\Delta t/3)$. If n interpolated values are calculated, then the corresponding pairs of signals are $a'(k\Delta t/[n+1])$, $b'(k\Delta t/[n+1])$. k and n can have values 1, 2, 3 and so on.

At the output of the computer unit 213 a sequence of signal pairs are transmitted which consist of pairs of measured signals $a(k\Delta t)$, $b(k\Delta t)$ and pairs of calculated signals $a'(k\Delta t/2)$, $b'(k\Delta t/2)$. Each pair of signals of the signal sequence at the outputs of the computer unit 213 are fed to a computer unit 214 in which an analysis of the signal sequence is carried out, for example by a Fourier transformation, to produce an output signal of which the amplitude corresponds to a phase variation of an indicator defined by the signals of the signal sequence and thus corresponds to the instantaneous value of the flow velocity.

When carrying out the analysis in the computer unit 214 the information contained in 64 up to 128 echo signals is considered. This number of echo signals is also substantially greater than the number of echo signals (from 4 to 8) of which the information content is considered for the calculation of the average value $v_a$ of the flow velocity in the computer unit 203.

Each signal of a signal pair at the input of the computer unit 214 is also fed by an digital/analog converter to means 215 or 216 for the acoustic reproduction of the signal.

The signals of the signal sequence which is composed of signals corresponding to measured values $a(k\Delta t)$, $b(k\Delta t)$, and calculated values $a'(k\Delta t/2)$, $b'(k\Delta t/2)$ have shorter time intervals between them than the signals corresponding to measured values $a(k\Delta t)$, $b(k\Delta t)$.

Figure 2:
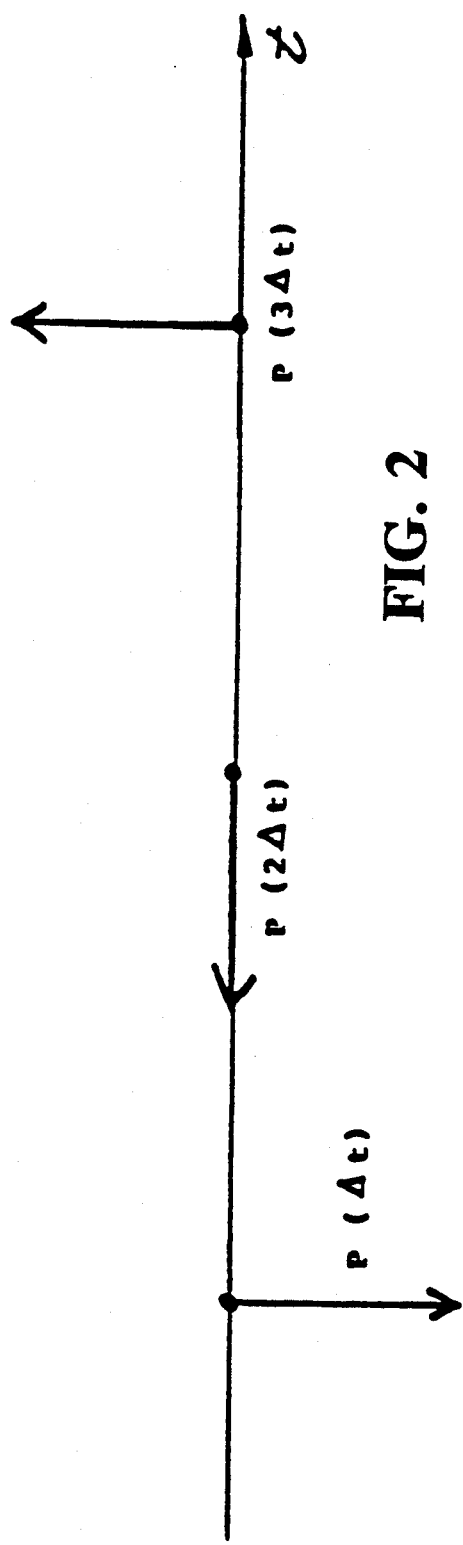
FIGS. 2 and 3 are diagrams which to illustrate the computer unit 213 in FIG. 1.
Figure 3:
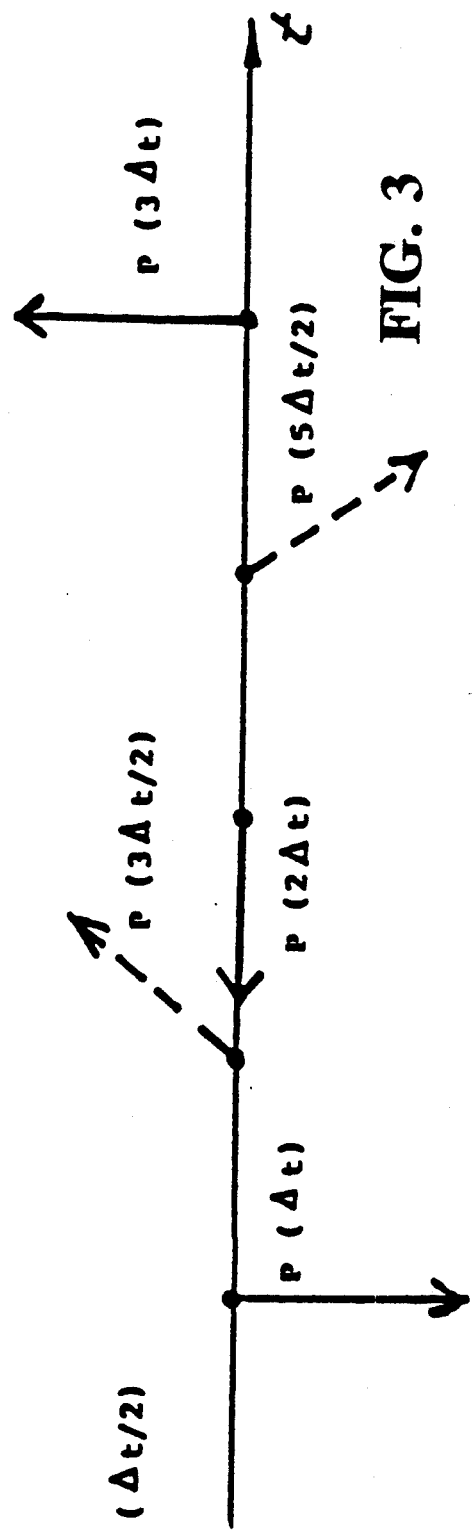

The function of the computer unit 213 is now explained with a simple example according to FIGS. 2 and 3. In FIG. 2 a signal $P(k\Delta t)$ is represented which has a phase shift of $\Delta\phi = +270°$ between the measuring points. Since the frequency of the analysis is however too small, this is measured as a phase shift of $\Delta\phi = -90°$. This is a typical example of alias distortion; both the quantity and the sign of the phase measured and therefore the velocity measured are false. The output signal of the computer unit 203 is fed to the computer unit 213, and this signal corresponds to the average value V of the flow velocity. From this average value it can be determined that the phase shift between the analysis values $\Delta\phi$ amounts to $+270°$. It is therefore possible to interpolate the calculated values between the measured values of the signal.

The values indicated with dashes in FIG. 3 $P(\Delta t/2)$, $P(3\Delta t/2)$, $P(5\Delta t/2)$ are interpolated values. The interpolation of the values between the measured values, for which the average velocity information from a two frequency procedure is utilised, is an essential characteristic of the invention described here.

The interpolation of the complex signal occurs in the polar representation, that is to say the quantity and phase are interpolated. From FIG. 3 it can be seen that the signal is now reproduced correctly; among the single values a phase shift is seen of $+135°$ and among the measured values a phase shift of $270°$. Since the number of complex values available in total is doubled by interpolation, the measurement range is also doubled.

The signal sequence represented in FIG. 3 of the complex measured and calculated values are fed to the computer unit 214 which carries out a Fourier transformation.

Among the measured values $a(k\Delta t)$, $b(k\Delta t)$ not only one but several calculated values $a'(k\Delta t/(n+1))$, $b'(k\Delta t/(n+1))$ can be interpolated. From the analysis theorem it is known that the maximum frequency univocally measurable $f_{max}$ is given by $$f_{max} = \pm f_s/2, \qquad (6)$$

in which $f_s$ indicates the frequency of analysis. If n values are interpolated between the measured values, then the frequency of analysis is multiplied by $(n+1)$. The new frequency limit $f_{max}$ is therefore $$f_{max} = \pm(n+1)f_s/2 = (n+1)f_{max} \qquad (7)$$

A new upper velocity limit $v_{max}$ corresponding to $f_{max}$ can be derived from equation (3) as follows $$v_{max} = (n+1)v_{max}$$

$$v_{max} = (n+1)c^2/8 f_1 d \cos\theta \qquad (8)$$

In the equation (4) there is an upper limit $v_{a\,max}$ for the determination of the average velocity of the two frequency procedure. Preferably $v_{max} = v_{a\,max}$, therefore $$(n+1)\,c^2/8 f_1 d\,\cos\theta = c^2/8(f_2 - f_1)d\,\cos\theta \qquad (9)$$
$$(n+1)/f_1 = 1/(f_2 - f_1)$$
$$n = (f_1/(f_2 - f_1)) - 1$$

Equation (9) gives the number of the measured values which are preferably interpolated between the measured values.

According to previous knowledge a widening of the measurement range with the two frequency method is possible by a factor 5. This subjects the interpolation to four values between every two values measured.

Description of a First Embodiment

Figure 4:
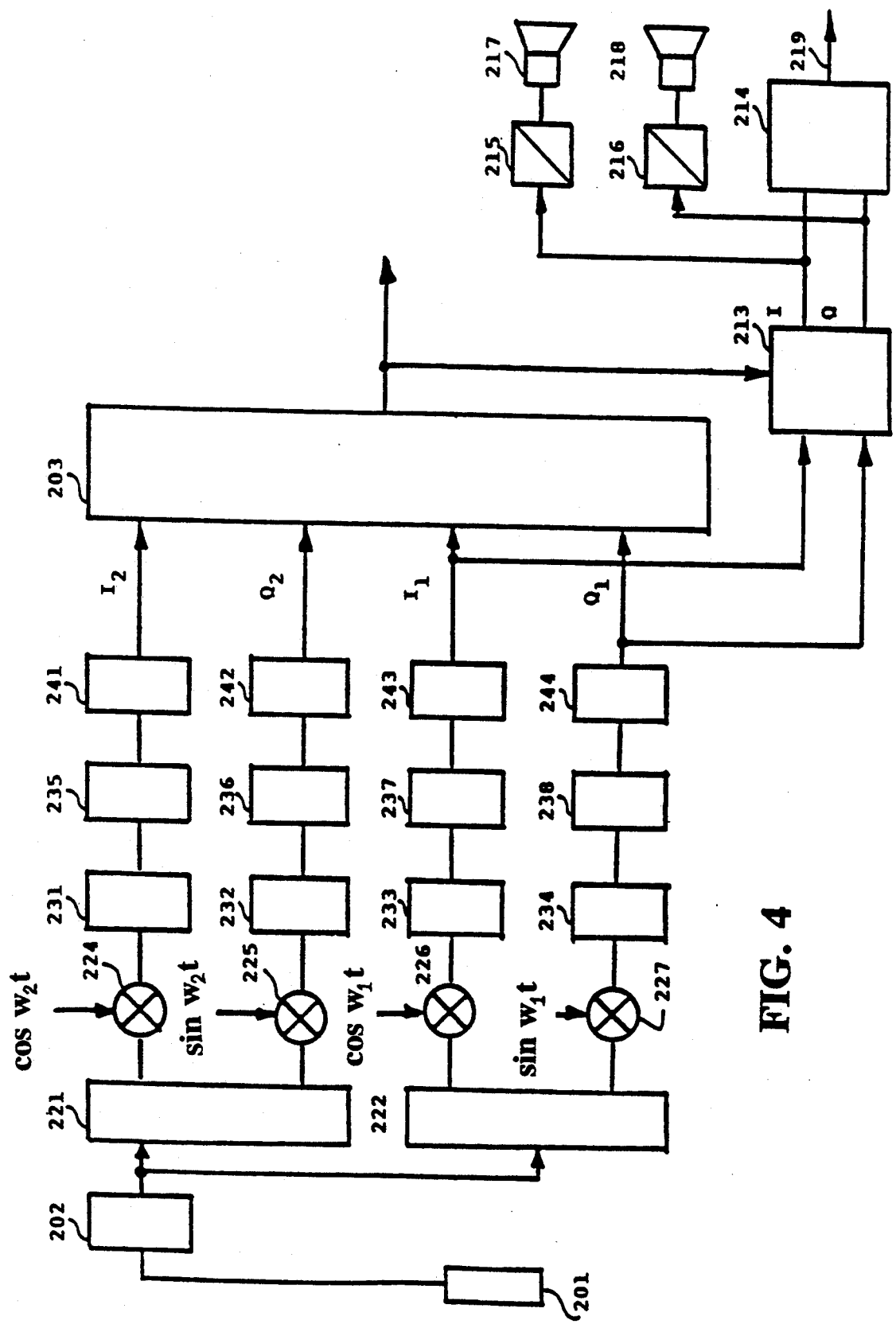
FIG. 4 is a first embodiment of the Doppler flow velocity meter of the present invention according to FIG. 1.

FIG. 4 shows a first embodiment of the Doppler flow velocity meter according to the present invention shown in FIG. 1. According to FIG. 4 an ultrasonic transducer 201 connected to a transmitter-receiver 202 transmits transmit pulses of which the frequency spectrum consists of two adjacent but separate frequency bands. These transmit pulses and devices for producing them are described subsequently in full detail making reference to FIGS. 7 to 17. In the circuit according to FIG. 4 the reception signal obtained from the ultrasonic transducer 201 and the transmitter receiver 202 is introduced into two quadrature channels. One of these channels processes the echo signals in the frequency band with average frequency $f_2$. The second quadrature channel processes the echo signals in the frequency band with average frequency $f_1$. The structure of these quadrature channels is in itself known in the pulsed Doppler technology. Each of these quadrature channels consists of a band pass filter 221 or 222 followed by a synchronous demodulator, which contains multipliers 224, 225 or 226, 227. The output signals of the multipliers are filtered by means of low pass filters 231, 232, 233, 234, and analysed by integrated maintenance circuits 235, 236, 237, 238. The constant signed erasers 241, 242, 243, 244 connected in series serve for the suppression of stationary or almost stationary echoes. The output signals $I_1$, $Q_1$, $I_2$, $Q_2$ of these constant sign erasers are introduced into the computer unit 203. There, these are first converted from analog into digital and thus processed in such a way that an output signal corresponding to the average velocity $v_a$ is obtained at the output of the computer unit 203. The output signals $I_1$, $Q_1$ of the constant sign erasers 243, 244 and the output signals of the computer unit 203 are processed in the computer unit 213 for producing as output signals a sequence of signal pairs I, Q which are made up of output signals $I_1$ and $Q_2$ and of signal pairs I' and Q' obtained by interpolation for one of the frequencies $f_1$ or $f_2$.

The signal sequence at the output of the computer unit 213 is fed to the computer unit 214 where the spectrum is calculated by means of a fast Fourier transformation according to a known algorithm. The computer units 203, 213, 214 are preferably realised with a digital signal processor, for example the AD 2100 processor of Analog Devices. The algorithms which are employed in the computer units 203 and 213 are described subsequently. The output signals of the computer unit 213 are converted by means of a digital/analog converter 215, 216 and are fed to two loudspeakers 217, 218. With this output signals which correspond to an enlarged measurement range of the flow velocity, are reproduced acoustically.

Description of a Second Embodiment

Figure 5:
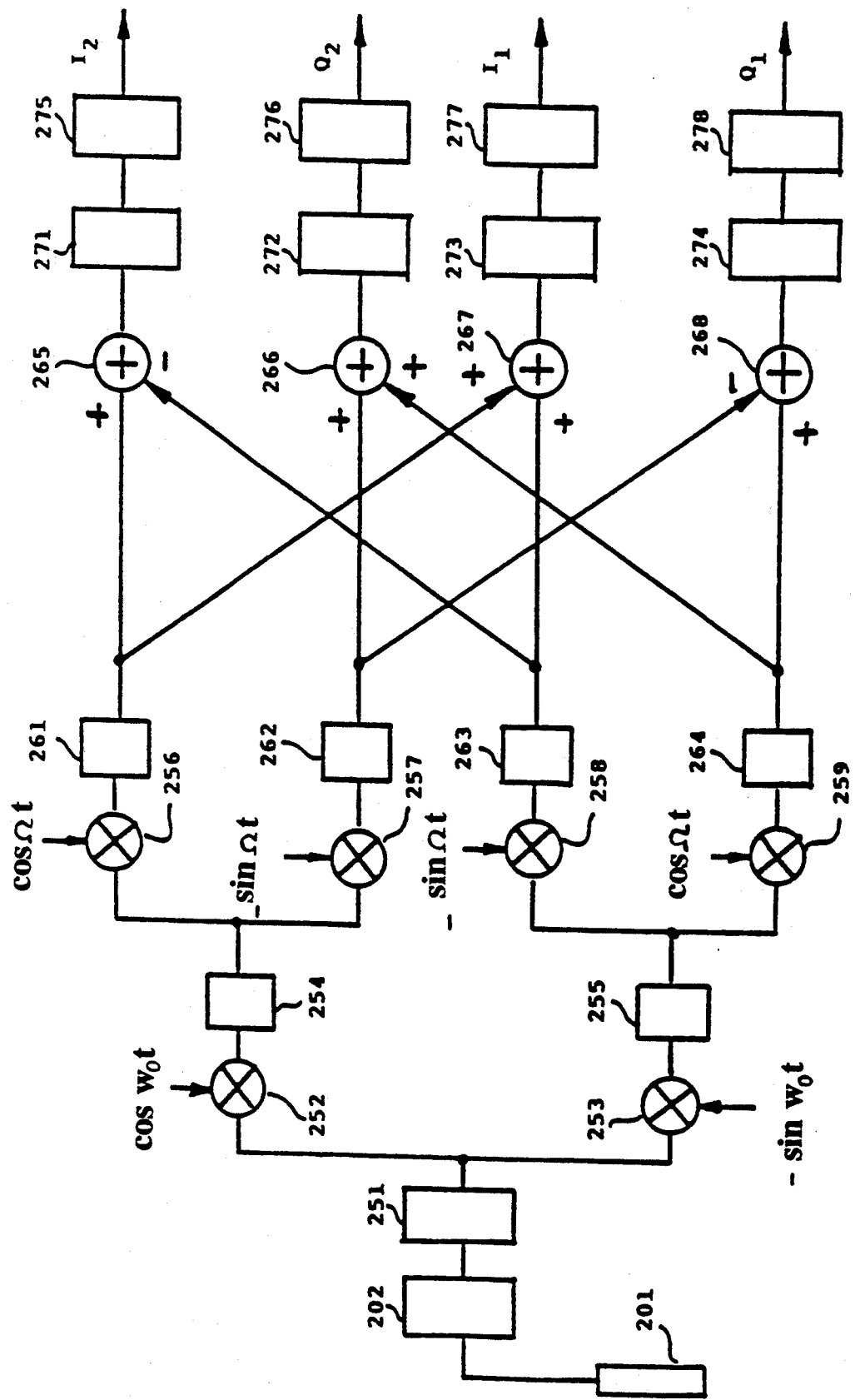
FIG. 5 is a second embodiment of the Doppler flow velocity meter of the present invention according to FIG. 1.

FIG. 5 shows a second embodiment of the Doppler flow velocity meter according to the present invention shown in FIG. 1. In the circuit according to FIG. 5 the ultrasonic transducer 201 and the transmitter receiver 202 are already as described for FIGS. 1 and 4. With a band pass filter 251 the echo signals are filtered in the two frequency bands of the transmit signals, that is to say allowed to pass for the signal processing.

With the circuit according to FIG. 5 a double demodulation procedure is carried out. The echo signal transmitted by the band pass filter 251 is first demodulated by means of the multipliers 252 and 253 and the low pass filters 254 and 255 with $\cos \omega_o t$ e $-\sin \omega_o t$ in which $$\omega_o = (\omega_1 + \omega_2)/2 \qquad (10)$$

and after which by means of the multipliers 256, 257, 258, 259 and the low pass filters 261, 262, 263, 264 demodulated with $\cos \Omega t$ e $-\sin \Omega t$ in which $$\Omega = (\omega_2 - \omega_1)/2 \qquad (11)$$

The required quadrature signals $I_1$, $Q_1$, $I_2$, $Q_2$ are therefore obtained from these signals by means of adders 265, 266, 267, 268 using suitable additions and subtractions, in which, as represented in FIG. 5, integration and holding circuits 271, 272, 273, 274 and constant sign erasers 275, 276, 277, 278 are employed in an analogous manner to the circuits according to FIGS. 1 and 4. The circuit according to FIG. 5 is more complicated than that of FIG. 4. It however offers the advantage that in the first quadrature demodulation the frequency of the transmit signal $\omega_o$ is employed. This is available with high stability. The processing of the signal which permits the achievement of the output signals $I_1$, $Q_1$, $I_2$, $Q_2$ of the two quadrature channels is now explained hereinbelow.

The signal received has a line spectrum. The distance between the single lines is the repetition frequency of the pulses, as known. Here one line $s(t)$ of the spectrum is considered which has a Doppler shift:

$$s(t) = \cos(\omega_o + \Omega + \omega_{d2})t + \cos(\omega_o - \Omega + \omega_{d1})t \qquad (12)$$

in which $\omega_{d1}$ and $\omega_{d2}$ are the Doppler frequency at $\omega_o - \Omega$ and at $(\omega_o + \Omega)$.

By means of the first demodulation the signals I(t) and Q(t) are obtained, which can be defined as follows:

At the output of multiplier 252 the following signal is obtained $$\cos\omega_o t \cos(\omega_o + \Omega + \omega_{d2})t + \cos\omega_o t \cos(\omega_o - \Omega + \omega_{d1})t.$$

At the output of the low pass filter 254 only the elements with the frequency difference are present, therefore $$I(t) = (\tfrac{1}{2})\cos(\Omega + \omega_{d2})t + (\tfrac{1}{2})\cos(\omega_{d1} - \Omega)t \quad (13)$$

For the quadrature channel at the output of the multiplier 253 the following signal is obtained:

$$-\sin\omega_o t \cos(\omega_o + \Omega + \omega_{d2})t$$

$$-\sin\omega_o t \cos(\omega_o - \Omega + \omega_{d1})t$$

At the output of the low pass filter 255 only the elements with frequency difference are present, therefore $$Q(t) = (\tfrac{1}{2})\sin(\omega + \Omega_{d2})t - (\tfrac{1}{2})\sin(\Omega - \omega_{d1})t \quad (14)$$

By means of the second demodulation the following signals are obtained each time at the output of the demodulators: at the output of multiplier 256

$$[(\tfrac{1}{2})\cos(\Omega + \omega_{d2})t + (\tfrac{1}{2})\cos(\Omega - \omega_{d1})t]\cos\Omega t$$

At the output of low pass filter 261:

$$a(t) = (\tfrac{1}{4})\cos\omega_{d2}t + (\tfrac{1}{4})\cos\omega_{d1}t \quad (15)$$

At the output of multiplier 257

$$[(\tfrac{1}{2})\cos(\Omega + \omega_{d2})t + (\tfrac{1}{2})\cos(\Omega - \omega_{d1})t](-\sin\Omega t).$$

At the output of low pass filter 262

$$b(t) = (\tfrac{1}{4})\sin\omega_{d2}t - (\tfrac{1}{4})\sin\omega_{d1}t \quad (16)$$

At the output of multiplier 258

$$[(\tfrac{1}{2})\sin(\Omega + \omega_{d2})t - (\tfrac{1}{2})\sin(\Omega - \omega_{d1})t](-\sin\Omega t)$$

At the output of low pass filter 263

$$c(t) = -(\tfrac{1}{4})\cos\omega_{d2}t + (\tfrac{1}{4})\cos\omega_{d1}t \quad (17)$$

At the output of multiplier 259

$$[(\tfrac{1}{2})\sin(\Omega + \omega_{d2})t - \tfrac{1}{2}\sin(\Omega - \omega_{d1})t]\cos\Omega t$$

At the output of low pass filter 264

$$d(t) = (\tfrac{1}{4})\sin\omega_{d2}t + (\tfrac{1}{4})\sin\omega_{d1}t \quad (18)$$

With the adders 265, 268 and the series connected circuits therefore the output signals indicated in FIG. 5 in $I_2$, $Q_2$, $I_1$, $Q_1$ which can be defined as follows $$I_2(t) = a(t) - c(t) = (\tfrac{1}{2})\cos\omega_{d2}t. \quad (19)$$

$$Q_2(t) = b(t) + d(t) = (\tfrac{1}{2})\sin\omega_{d2}t. \quad (20)$$

$$I_1(t) = a(t) + c(t) = (\tfrac{1}{2})\cos\omega_{d1}t, \quad (21)$$

$$Q_1(t) = d(t) - b(t) = (\tfrac{1}{2})\sin\omega_{d1}t. \quad (22)$$

From these equations it can be seen that with the circuit according to FIG. 5 the desired quadrature signals can be obtained. One must note that $\omega_{d1}$ is associated with the transmit frequency $\omega_1 = \omega_0 - \Omega$ and $\omega_{d1}$ is associated with the frequency $\omega_2$ of transmission $\omega_2 = \omega_0 + \Omega$. The corresponding velocity values can therefore be calculated according to the Doppler formula $$V_1 = -\omega_{d1} \cdot c/2 \cdot (\omega_o - \Omega)\cos\theta \quad (23)$$

$$V_2 = -\omega_{d2} \cdot c/2 \cdot (\omega_o + \Omega)\cos\theta \quad (24)$$

Circuits for the further processing of the signals $I_1$, $Q_1$, $I_2$, $Q_2$ are as already described with reference to FIG. 4. These circuits therefore are not shown in FIG. 5.

Description of Algorithms Used in the Outline of the Invention

In the computer unit 203 in FIG. 4 the average velocity is calculated according to the two frequency procedure. In the computer unit 213 further signal values of a Doppler path are interpolated as described above with reference to FIGS. 2 and 3. The algorithms for these calculations must be described here. The computer unit 214 calculates a fast Fourier transformation with the use of algoritms which are sufficiently well known and are therefore not described.

Algorithms for the Calculation of Average Velocity According to the Two Frequencies Procedure The Doppler signals in the equations 19, 22 can be expressed as follows under the form of the complex signals P(t)

$$P_1(t) = I_1(t) + jQ_1(t) = (\tfrac{1}{2})(\cos\omega_{d1}t + j\sin\omega_{d1}t) \quad (25)$$
$$= (\tfrac{1}{2})\exp(j\omega_{d1}t)$$

$$P_2(t) = I_2(t) + jQ_2(t) = (\tfrac{1}{2})(\cos\omega_{d2}t + j\sin\omega_{d2}t) \quad (26)$$
$$= (\tfrac{1}{2})\exp(j\omega_{d2}t)$$

Equations (25) and (26) define two complex indicators which rotate with the angular Doppler velocity $\omega_{d1}$ or $\omega_{d2}$. To determine one of the angular Doppler velocities, for example $\omega_{d1}$, one measures the phase difference of the indicator in correspondence with two successive times and from this the value of the angular Doppler velocity is calculated as follows:

$$\omega_{d1} = \phi_1/\Delta t \quad (27)$$

$\phi_1$ is the phase difference between $P_1(t + \Delta t)$ and $P_1(t)$. This phase difference can be determined by a complex multiplication.

$$\phi_1 = \arg[P_1(t + \Delta t)P^*_1(t)], \quad (28)$$

in which arg[ ] signifies the angle of the complex number and $P^*_1(t)$ is the complex conjugate value of $P_1(t)$.

Because of noise and oscillation in the signal which corresponds to the velocity to be measured, the calculated value of $\phi_1$ according to equation 28 is not reliable. The reliability of this value can be improved by carrying out the average. It has been found to be useful to calculate the following vector $$P_{1N} = \frac{\sum_N P_1(t + \Delta t) P^*_1(t)}{\sum_N |P_1(t)| \cdot |P_1(t + \Delta t)|} \qquad (29)$$

$\Sigma$ signifies a summation of N values. From equation 29 $P_{1N}$ and therefore $\phi_1$ can be determined as follows.

$$\phi_1 = \arg(P_{1N}) \qquad (30)$$

The indicator $P_{1N}$ is normalised, in which $/P_{1N}/$ is in the range from equal to or greater than 0 up to equal to or greater than 1, that is $$0 \leq |P_{1N}| \leq 1. \qquad (31)$$

Figure 6:
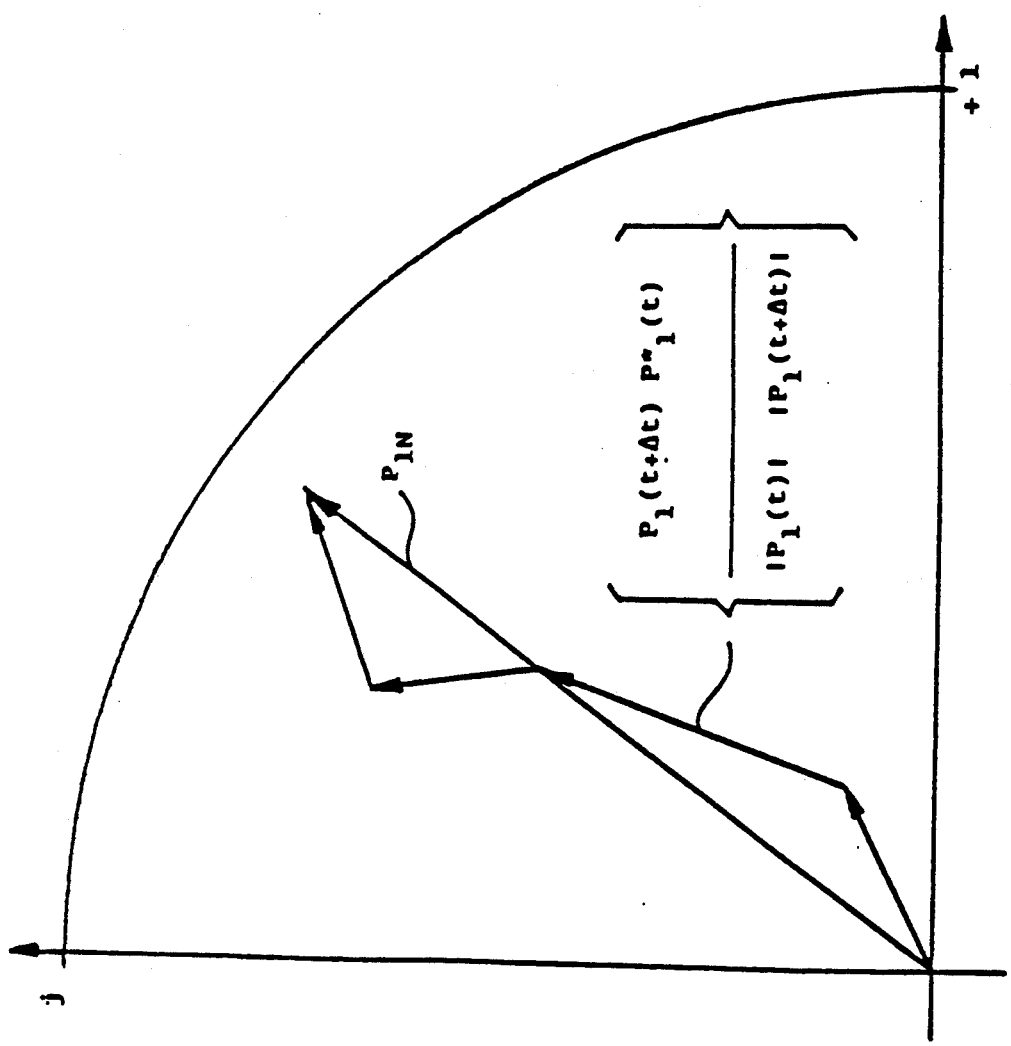
FIG. 6 shows the indicator graphs.

The length of the indicator $P_{1N}$ is a measurement of the signal quality. The indicators which are considered in the calculation of $P_{1N}$, are represented in FIG. 6. If all the indicators summed are in the same direction, $/P_{1N}/ << 1$.

In an analogous manner one can calculate for the second frequency $$P_{2N} = \frac{\sum_N P_2(t + \Delta t) P^*_2(t)}{\sum_N |P_2(t)| \cdot |P_2(t + t\Delta t)|} \qquad (32)$$

and $$\phi_2 = \arg(P_{2N}) \qquad (33)$$

According to the Doppler equation (2) and if in this $\cos\theta = 1$ ($\cos\theta = 1$ signifying that one obtains the velocity projected on the axis of the radius) one can also write $$\phi_1 = \omega_{d1} \cdot \Delta t = -\omega_1 \Delta t 2v/c \qquad (34)$$

$$\phi_2 = \omega_{d2} \cdot \Delta t = -\omega_2 \Delta t 2v/c \qquad (35)$$

in which $\omega_1 = 2\pi f_1$ and $\omega_2 = 2\pi f_2$.

By means of subtraction of equation 34 from equation 35 one obtains:

$$\Delta\phi = \phi_2 - \phi_1 = -\Delta t(\omega_2 - \omega_1) 2v_a/c \qquad (36)$$

From this the velocity determinable with the two frequency procedure is obtained by the formula $$V_a = -\Delta\phi \cdot c/[2\Delta t(\omega_2 - \omega_1)] \qquad (37)$$

The value of $\Delta\phi$ is univocal in a range of equal or greater than $-\pi$ up to equal or less than $\pi$, and that corresponds to the Nyquist range. The univocal measurement range of $v_a$ is increased, since $\Delta\phi$ is much smaller than $\phi_1$ and $\phi_2$.

Experience shows that good results are obtained if the average of 4 to 8 values is carried out in equation (29) and (32), that is to say N can have for example values from 4 to 8.

Algorithm for the Interpolation of the Doppler Signal.

Interpolation serves to modify the Doppler signal to a determined frequency in order that the univocal measurement range of V is increased. As described above with reference to FIGS. 2 and 3, this is obtained by the fact that further values are interpolated between these measurement values. As an example here the interpolation of a value between two measured values of the signal $P_1(t)$ at the frequency $\omega_1$. The measured signal $P_1(t)$ consists of the values $$P_1(O), P_1(\Delta t), P_1(2\Delta t), P_1(3\Delta t), \qquad (38)$$

By means of interpolation further values of $\Delta t/2$, $3\Delta t/2$, $5\Delta t/2$ and so on are calculated. Here below the calculation of the value $P_1(t/2)$ is described. Previously the phase difference $\phi_1$ between $P_1(\Delta t)$ and $P_1(0)$ according to equation (28) is calculated. This phase $\phi_1$ is univocal in the range of $\pi$ to a $+\pi$, that is $$-\pi \leq \phi_1 \leq +\pi \qquad (39)$$

As further information for interpolation the average value $v_a$ of the velocity $v_a$, is utilised, which is calculated by the two frequency procedure, as seen from equation 37. On the basis of $v_a$ one can calculate a phase $\phi_1$ according to equation 34.

$$\phi_1' = -\omega_1(2V_a/c)\Delta t \qquad (40)$$

With the value $\phi_1'$ one finds whether the value $\phi_1$ effectively stays in the range from $-\pi$ to $+\pi$. When $|\phi_1' - \phi_1| > \pi$, a multiple k of $2\pi$ is added to the phase difference $\phi_1$ between $P_1(\Delta t)$ and $P_1(0)$. Thus a value of k is determined $$k = \text{round}\,([\phi_1' - \phi_1]/2\pi) \qquad (41)$$

In which round ( ) signifies the rounding up to the next whole number. The value $P_1(\Delta t/2)$ is thus interpolated as follows:

$$\arg P_1(\Delta t/2) = \arg P_1(0) + (\tfrac{1}{2})(\phi_1 + k \cdot 2\pi) \qquad (42)$$

$$|P_1(\Delta t/2)| = (|P_1(0)| + |P_1(\Delta t)|)/2 \qquad (43)$$

Argument and amplitude of the signal $P_1(\Delta t/2)$ is therefore converted again in a known way into quadrature signals $I_1(\Delta t/2)$ and $Q_1(\Delta t/2)$.

If it is desired to interpolate $(m-1)$ intermediate values between $P_1(0)$ and $P_1(\Delta t)$, then the interval t is subdivided into m lengths. Therefore the nth interpolated value is obtained with $(n < m)$ as follows $$\arg P_1(n\Delta t/m) = \arg P_1(0) + (1/m)n(\phi_1 + k \cdot 2) \qquad (44)$$

$$|P_1(n\,t/m)| = |(|P_1(0)| + (n/m)(|P_1(\Delta t)| - |P_1(0)|))| \qquad (45)$$

The signal sequence consisting of signals which correspond to the measured values or the values interpolated between these, are fed to the computer unit 214 in which a fast Fourier transformation is calculated.

As a general observation it must be repeated once again that the average velocity value is determined from relatively few values, typically from 4 to 8 values. The Fourier transformation is on the contrary calculated from a substantially greater number of values. It is therefore certainly possible that the average frequency and therefore the average value of the velocity varies along the signal sequence, along which the Fourier transformation is calculated. This signifies that the frequency range of the Fourier transformation can be greater than the original Nyquist range. This is a further difference with respect to the abovementioned tracking procedures. These work only when the width of the signal band is less than the original Nyquist range.

Description of the Devices for the Production of the Transmit Pulses

Figure 7:
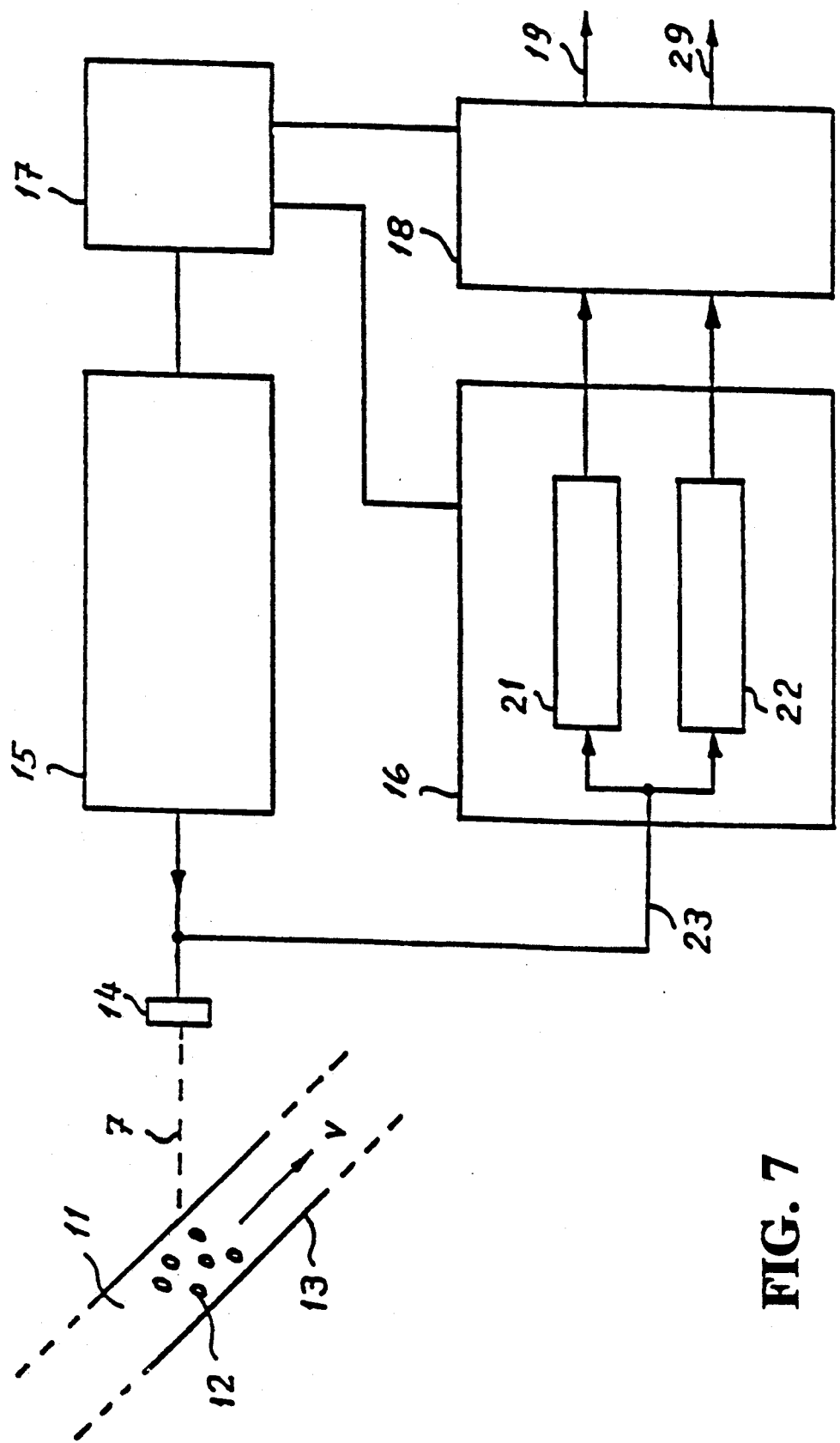
FIG. 7 is a block diagram of a Doppler flow velocity meter.

FIG. 7 shows the block diagram of a Doppler Flow Velocity Meter for the measuring of flow velocity in a fluid 11 carrying particles 12 which reflect ultrasonic waves. The fluid can for example be blood which flows through a blood vessel. The principle of this device is described in the published German Patent Application DE-A-2 406 630 and the corresponding U.S. Pat. No. 3,914,999. According to this known principle a fluid 11 which flows for example through a tube 13 is irradiated with at least two successive ultrasonic pulses transmitted from a transducer 14, the echoes shifted by the corresponding Doppler frequency by reflectors (for example particles) in the fluid along the ultrasonic beam are received by the same transducer 14, and from the phase difference between echoes having the same transit time of the first and second transmitted ultrasonic pulses by means of suitable processing in an evaluator 18 an output signal is produced of which the temporal pace corresponds to the velocity profile of the fluid in the section examined.

The device contains an ultrasonic transducer 14, a transmitter 15, a receiver 16, a central control unit 17 and an evaluator 18.

In the direction indicated by the broken straight line 7, the ultrasonic transducer 14 irradiates the fluid 11 with ultrasonic wave pulses in response to the corresponding transmit pulses which are fed with a predetermined pulse repetition frequency. The transducer 14 also receives the echo waves reflected by the particles in the fluid and transmits the corresponding echo signals.

The transducer 14 is for example an ultrasonic transducer with the following technical data:

The transmit frequency must be preferably of about 3.0 MHz.

Resonance frequency of the ceramic: 3.2 MHz
Diameter of the circular ceramic: 13 mm
Radius of curvature of the ceramic: 120 mm
Distance between the transducer and the limit of the near field and the far field: 88 mm.

The transmitter 15 is connected with the ultrasonic transducer 14 and serves for the production of the transmit pulses with which the ultrasonic transducer is excited for the emission of the ultrasonic wave pulses.

In the receiver 16 which is similarly connected to the transducer 14, the echo signals are processed which correspond to at least two groups of echo signals, which are reflected by the particles in the fluid in response to a first and to a second pulse of the emitted wave. Adjacent but separate frequency bands of echo signals are processed in the receiver 16 each in a separate signal processing channel 21 or 22.

With the evaluator 18 which is joined to the outputs of the receiver 16, at least one output signal which contains information on the flow velocity is derived from the Doppler information obtained with the receiver.

The central control unit 17 produces all the control and timing signals which are necessary for a programmable operation of the Doppler meter. The control unit 17 is therefore substantially a programmable digital signal generator. The most important functions of the central control unit 17 are as follows:

It controls the transmitter 15 determining the time and the duration of the transmit pulses.

It supplies all the timing signals for the receiver 16 and therefore controls the signal flow through the receiver. It provides the timing signals for the evaluator 18 and therefore controls the signal flow through it.

Figure 8:
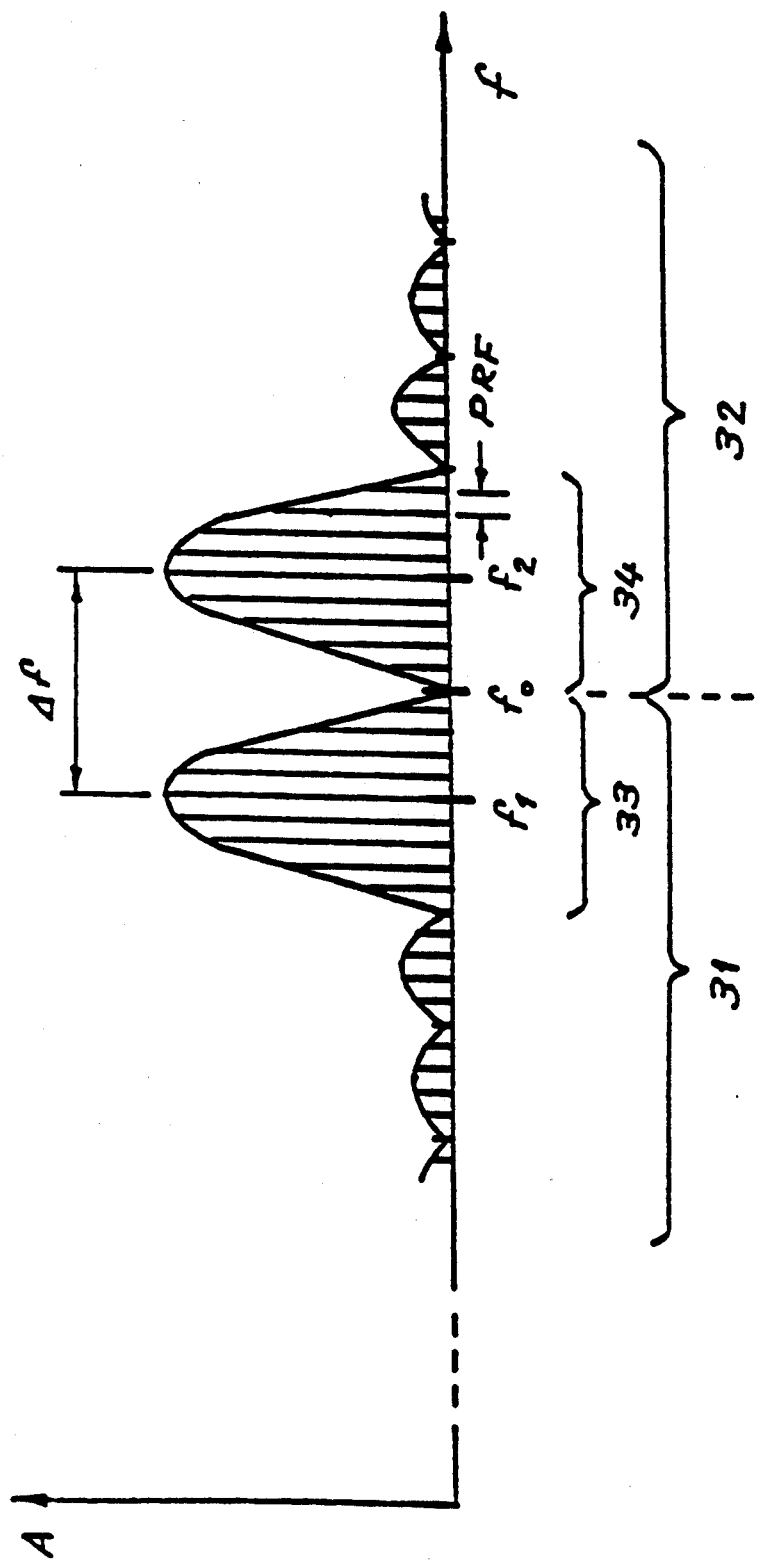
FIG. 8 shows the frequency spectrum of a sequence of transmit pulses with a waveform according to FIG. 9.

According to the present invention the transmitter 15 is designed so that the frequency spectrum of the sequence with which the periodic achievement of transmit pulses consists of two adjacent but separate frequency bands 31 and 32 which are represented in FIG. 8. Since the transmit pulses are emitted periodically with the frequence of the pulse repetition, the spectrum of the transmit signal frequency consists of a network of frequency lines with the distance between the lines corresponding to the pulse repetition frequency. By means of the form or the conformation of the frequency spectrum of the transmit signal, the result is that most of the energy sent is concentrated in these frequency bands around two frequencies $f_1$ or $f_2$.

The frequency bands 31 or 32 are so close to each other that they can be radiated by the same ultrasonic transducer and undergo about the same weakening of the structure. The frequencies $f_0$, $f_1$ and $f_2$ have for example the following values: $f_0 = 3.2$ MHz, $f_1 = 2.95$ MHz and $f_2 = 3.45$ MHz.

Preferably the majority of the energy emitted is concentrated in two adjacent frequency bands 33 or 34, in which the carrier frequency $f_0$ defines the limit between these bands and in which $f_1$ is the average frequency of the frequency band 33 and $f_2$ the frequency of the average frequency band 34.

The distance between the frequencies $f_1$ and $f_2$ is defined as the frequency interval $f_0$. Because of the symmetric arrangement of $f_1$ and $f_2$ with respect to $f_0$ the equation $f_2 - f_0 = f_0 - f_1 = \Delta f/2$ is valid.

Figure 9:
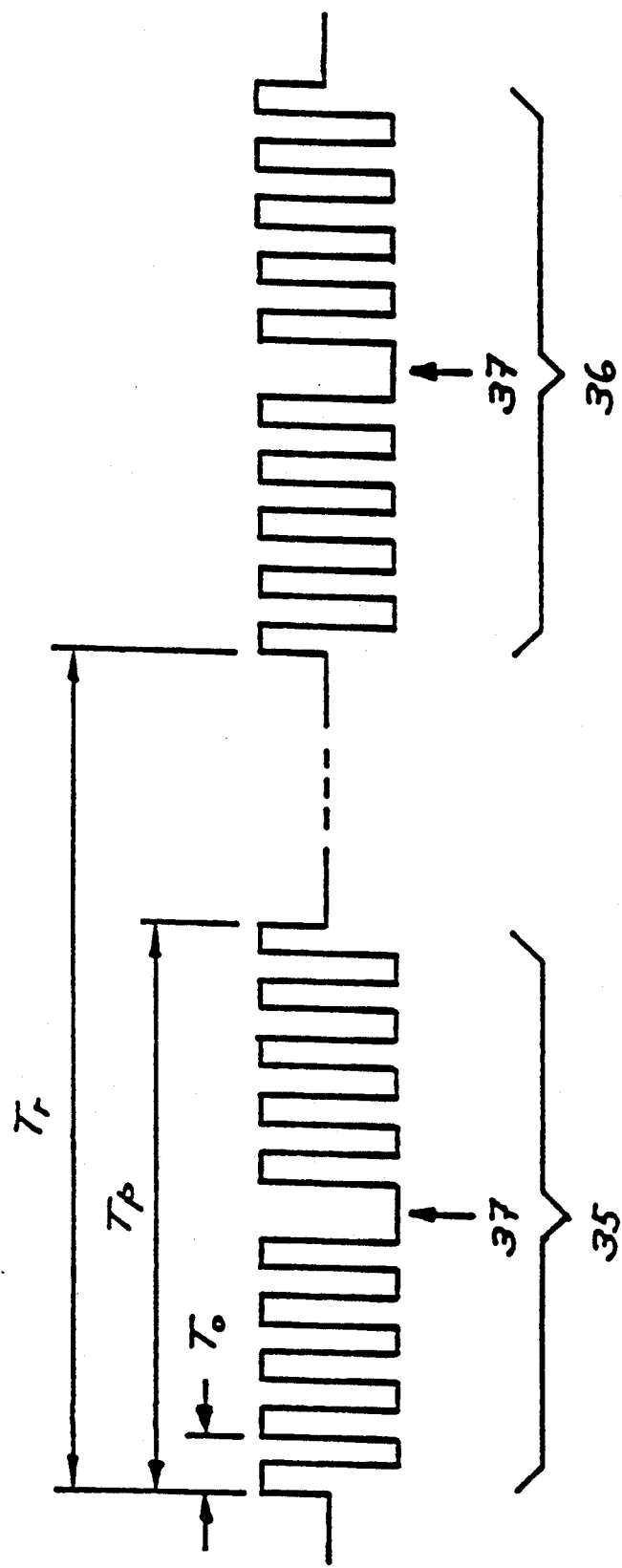
FIG. 9 shows transmit pulses.

FIG. 9 shows an example of two successive transmit pulses 35 or 36. The sequence emitted by these transmit pulses has a transmission spectrum according to FIG. 8. Each of these transmit pulses 35 or 36 consists mainly of a rectangular signal of the frequency $f_0$, in order that the oscillation period of the rectangular signal amounts to the period $t_0 = 1/f_0$. The duration of a transmit pulse is $T_P$ and amounts to for example, $T_P = 6$ microseconds. The distance $T_r$ between the successive transmission pulses amounts, for example, to 250 microseconds, which corresponds to a pulse repetition frequency PRF=4 KHz.

The transmit pulses sent to the transducer have for example a voltage which is between 50 and 100 Volts.

As is shown by FIG. 9, each transmit pulse deviates from a periodic rectangular signal because that the signal has a point 37 at the centre in which a phase inversion occurs. This phase inversion is necessary in order that the periodic sequence of the transmit pulses has a frequency spectrum according to FIG. 8.

FIGS. 15 and 16 show two further examples of transmit pulses. The transmit pulse according to FIG. 15 is composed of three elements of transmit pulse, in which each element has the pace of the transmit pulse 35 according to FIG. 9. The transmit pulse according to FIG. 16 contains two entire transmit pulse elements with the pace of the transmit pulse 35 according to FIG. 9 and at the beginning and end, parts of one such element of transmit pulse.

Since the transmit pulse according to FIG. 16 contains a little less than 3 whole transmit pulse elements, its duration is a little shorter that the duration of the transmit pulse according to FIG. 15. As is shown in FIG. 16, the transmit pulse can start in correspondence with a desired edge of a transmit pulse element.

The transmit pulses according to FIGS. 15 and 16 contain points of phase inversion 181-185, in which each of the phase inversion points 181, 183, 185 correspond to phase inversion point 37 of FIG. 9, while the phase inversion points 182, 184 form by the joining of two elements of the signal pulse. In the practical embodiment, the transmit pulses are produced by temporal segmentation of a signal in itself continuous, which possesses periodically distributed phase inversion points.

Figure 17:
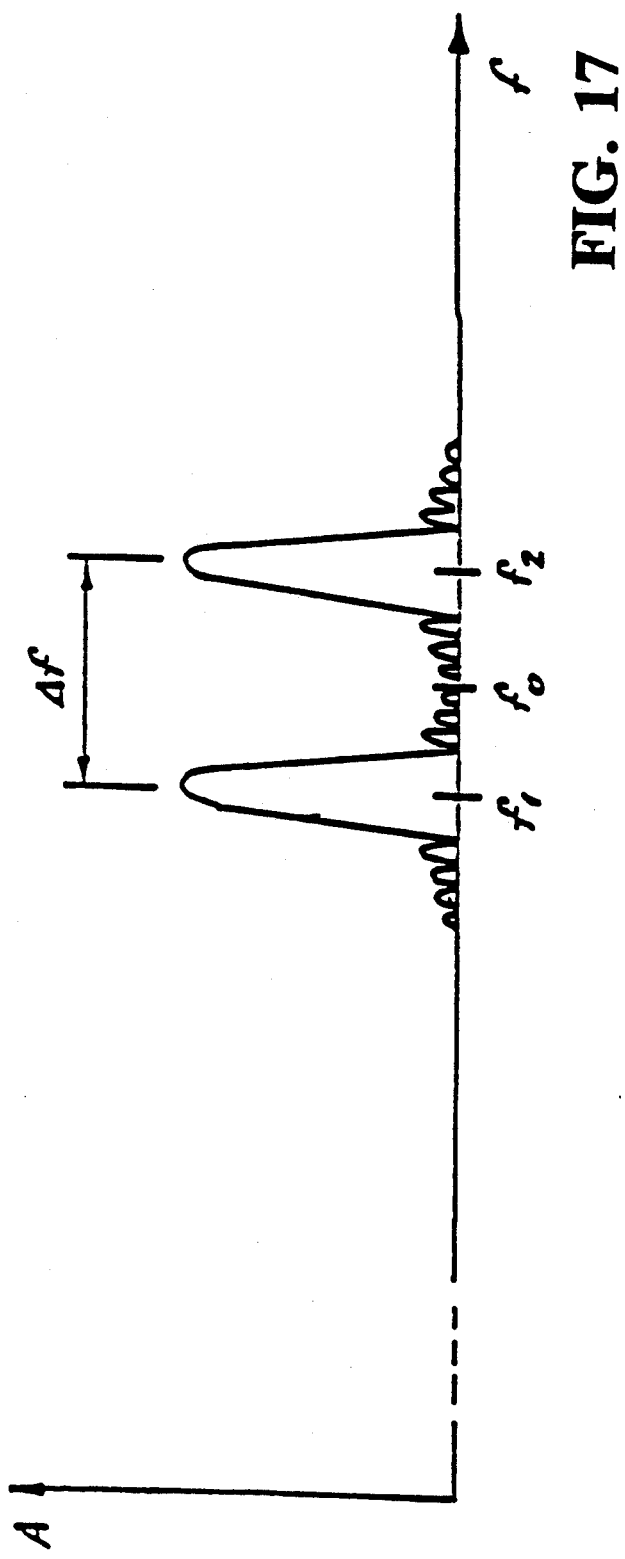
FIG. 17 is a schematic representation of the frequency spectrum of a sequence of transmit pulses with a waveform according to FIGS. 15 or 16.

FIG. 17 shows a schematic representation of the frequency spectrum of a sequence of transmit pulses which has the waveform shown in FIG. 15 or in FIG. 16. For the simplification of the presentation in FIG. 17 represented simply is the Hull curve of the network of frequency lines, which forms a frequency spectrum as in FIG. 8. From a comparison with the transmission spectrum according to FIG. 8 for a sequence of transmit pulses which each contain only one element of transmit pulse, with the frequency spectrum according to FIG. 17 for a sequence of transmit pulses which each contain various elements of transmit pulse, it can be seen that by the utilisation of these said transmit pulses according to FIGS. 15 and 16 a stronger concentration can be obtained of the energy of the ultrasonic waves emitted in narrower frequency bands around the frequencies $f_1$ and $f_2$, in which the distance f is equal as in FIG. 8.

As in FIG. 8, in FIG. 17 with $\Delta f$ the distance between $f_1$ and $f_2$ is indicated.

As shown in FIG. 15, the period of the points of phase inversion, that is to say the time interval between the inversion points of equivalent phases, is indicated with $T_u$, in which $T_u$ is equal to $2/\Delta f$. This follows also for the transmit pulse according to FIG. 16.

Within a transmit pulse according to FIG. 15 or FIG. 16 the points of phase inversion must be at regular time intervals $T_e = T_u/2$.

If the transmit signal consists of a sequence of transmit pulses of the duration $T_p$, and $T_p$ as in FIGS. 15 and 16 it is much bigger than $T_u$, the position of the start of the transmit pulses and its end are not obligatory with respect to the position of the inversion points of the phases contained in it.

The duration $T_p$ of the transmit pulse is preferably greater than the period $T_u$ of the points of phase inversion. To guarantee the transmit signal spectrum according to FIG. 8, $T_p$ must be choosen so that it is greater than $T_u$. The greater $T_p$ is with respect to $T_u$, the stronger the concentration of the energy emitted around the lateral band average frequency $f_1$ and $f_2$ in the frequency spectrum of the transmit signal.

Figure 10:
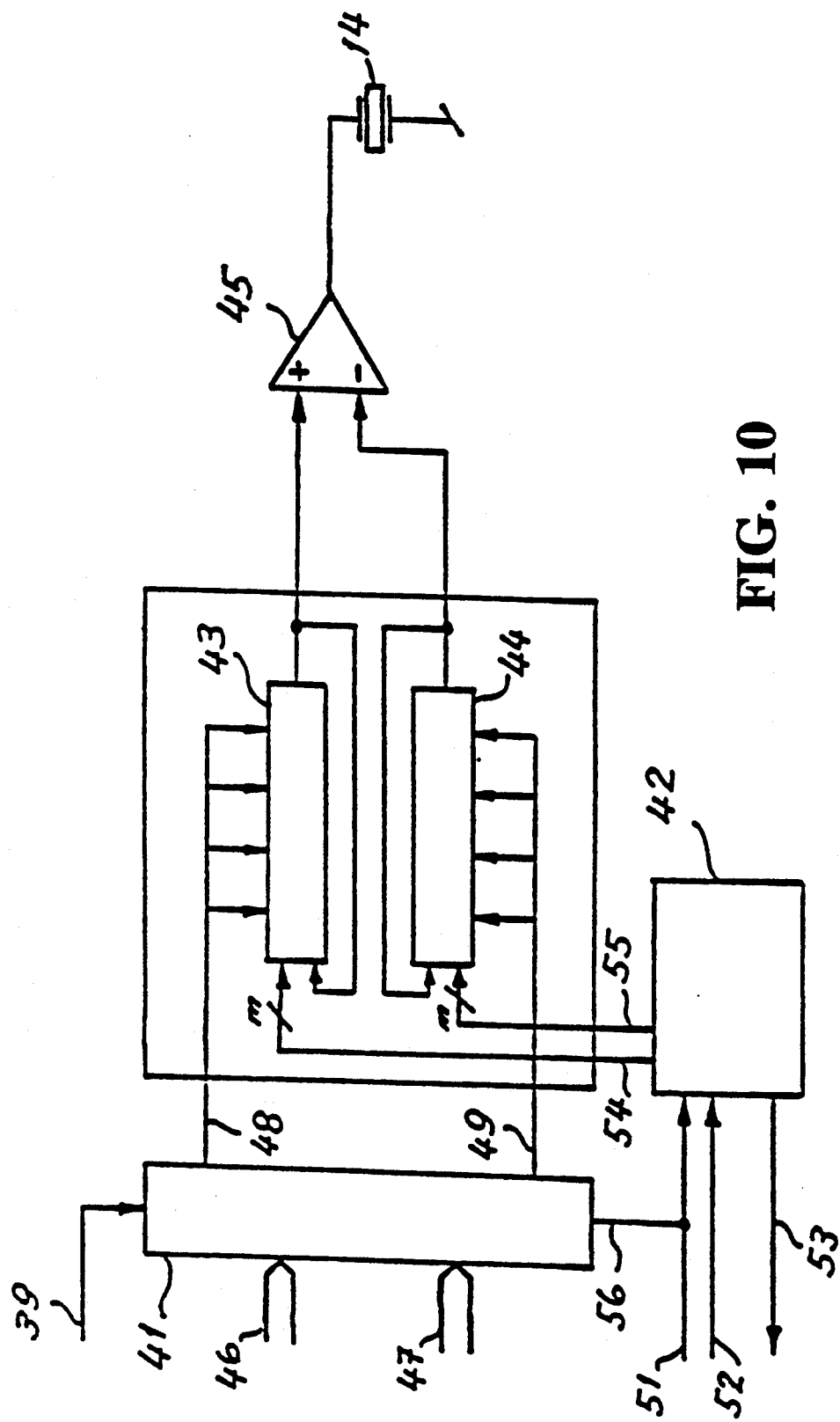
FIG. 10 is one of the block diagrams of a first embodiment of the transmitter 15 in FIG. 7.

FIG. 10 shows a first embodiment of the transmitter 15 in FIG. 7. This embodiment consists substantially of digital components. The transmitter circuit according to FIG. 10 includes a control interface 41, a control unit 42, two scroll registers and a power amplifier 45 the output of which is connected to the ultrasonic transducer 14 in FIG. 7. With the circuit according to FIG. 10 transmit pulses are produced according to FIG. 9 in which the transmitted periodic sequence of the transmit pulses has a frequency spectrum according to FIG. 8.

The necessary signals are fed to the control interface 41 by lines 39, 56, 51, an address bus 46 and a data bus 47. The interface 41 is connected to the registers 43 or 44 by lines 48 or 49. The outputs of the registers 43 or 44 are each connected to an input of the power amplifier 45. The control unit 42 is connected by lines 51, 52, 53 to the central control unit 17 in FIG. 7. The control unit 42 is also connected by a line 56 to the interface 41 and by lines 54 or 55 to the registers 43 or 44.

The registers 43 and 44 have the same structure and corresponding connections. These registers are however loaded with different but complementary bytes.

Figure 11:
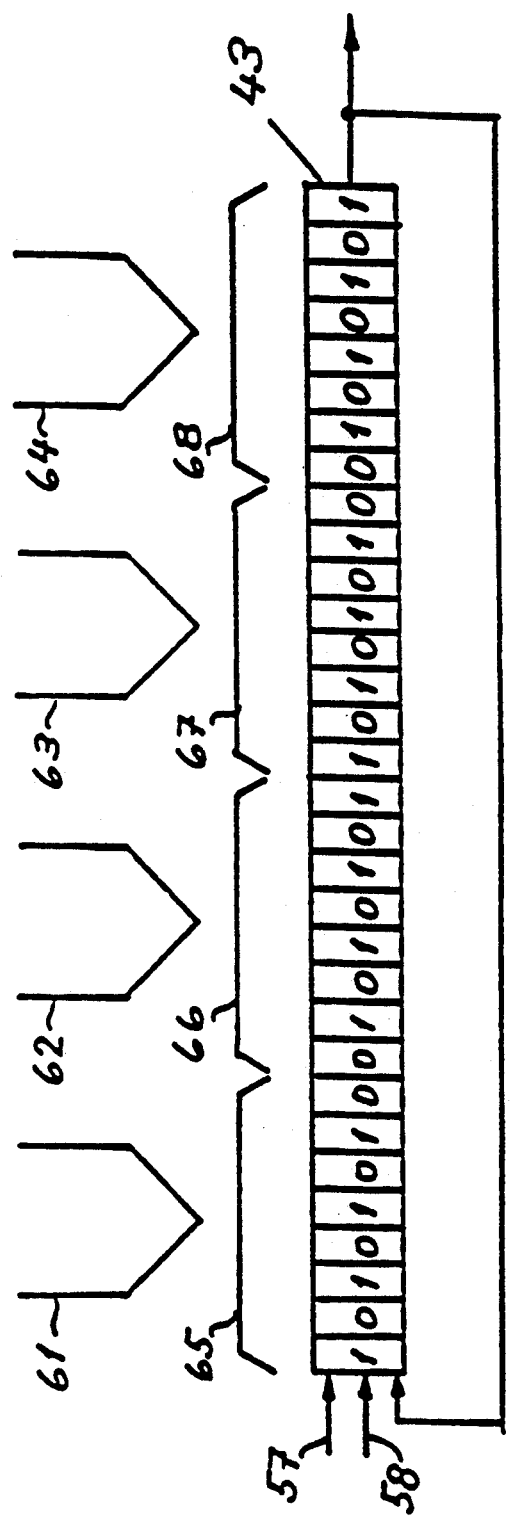
FIG. 11 is a block diagram of the register 43 in FIG. 10.

FIG. 11 shows a schematic representation of the register 43 in FIG. 10. As shown in FIG. 11, in this register four bytes (words) 65, 66, 67, 68 are loaded by corresponding lines of buses 61, 62, 63, and 64 in register 43. The content of these bytes is represented in the memory cells of register 43 in FIG. 11.

As can be seen from FIG. 10 each of the registers 43 and 44 have a feed-back from its output to its input. As described subsequently in greater detail, this is important for the suitable operation of the transmitter circuit according to FIG. 10. It is equally important that the contents of the registers 43, 44 are complementary, that is to say that for example 101010... is stored in Register 43 and 010101... in Register 44.

The operation of the transmitter circuit according to FIGS. 10 and 11 is now explained with reference to the signal diagrams according to FIG. 12.

The control interface 41 serves to program the control unit 42 and the scroll registers 43 and 44.

Figure 12:
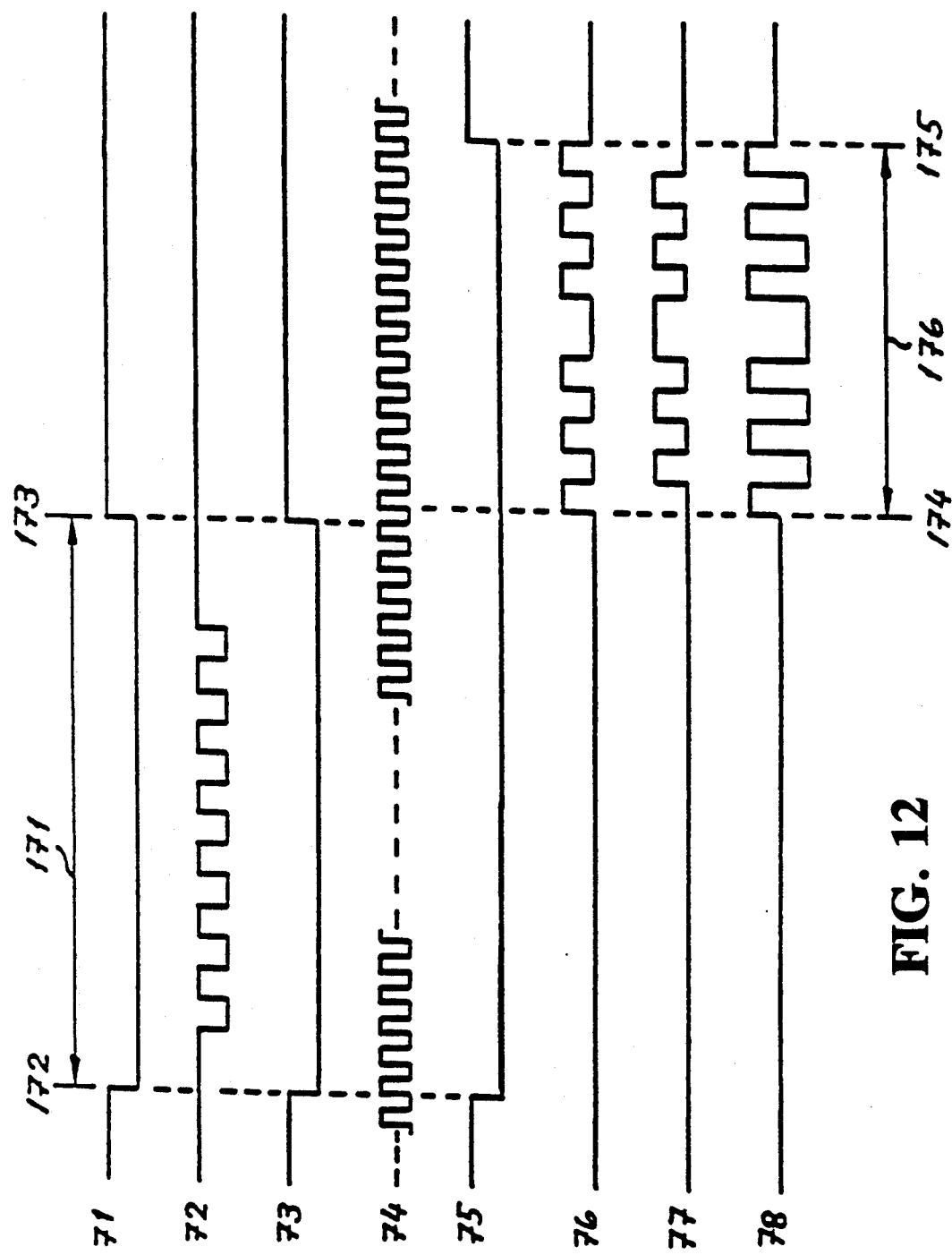
FIG. 12 shows signal diagrams for the illustration of the transmitter operation according to FIG. 10.

For this purpose the interface receives from the address or data buses 46, 47 and from line 39 the associated stroboscopic signal 72 in FIG. 12 from the bus of the decodified microprocessor of the principle system according to FIG. 7. The signal 72 is a timing signal which effects loading of bytes supplied in the registers 43, 44. For the control of the loading of the bytes provided in the registers 43 or 44, the interface 41 receives a further signal 71 from lines 51 and 56. The loading of the provided bytes is possible only in the time interval 171 in which the signal 71 has the state shown. For the control of the loading of the bytes supplied in registers 43 or 44 in control unit 42 in response to the signal 71 a further signal 73 is produced which is fed to the registers by lines 54 or 55. By means of line 52 the control unit 42 also receives a timing signal from the central control unit 17 in FIG. 7. In response to this timing signal, the control unit 42 produces a corresponding timing signal 74 which is fed to the registers 43 or 44 by means of the lines 54 or 55.

As shown in FIG. 12 the interval 171 provided for the loading of registers 43 or 44 lasts between the times 172 or 173, in which a variation of the state of signals 71 and 73 is verified each time. After the time interval 171 with the nearer leading edge of the timing signal 74 at time 174 a scroll cycle begins in the registers 43 or 44. By means of this scroll cycle effected by the timing signal 74 an output signal 76 or 77 is produced in each of the outputs of the registers 43 or 44. With the power amplifier 45 in FIG. 10 the difference of these output signals 76 and 77 is established and in this manner a transmit pulse 78 is produced which has the desired pace according to FIG. 9.

As represented in FIG. 12, the scroll cycle in registers 43 or 44 is extended on a time interval 176 which lasts from time 174 until time 175. The duration of the time interval 176 and therefore the duration of the transmit pulse 78 is determined by a counter contained in the control unit 42, which at time 175 effects a signal variation that marks the end of the transmit pulse 78. The signal 75 is transmitted by means of a line 53 of the control unit 42 at the central control unit 17 in FIG. 7.

The registers 43 or 44 are scroll registers with the structures shown in FIG. 11 for the register 43. As shown here, each of these registers has 4×8 memory cells each for a byte, which are loaded by means of the interface 41 with 4 bytes each of 8 bits. As already described above, subsequently the 32 bit long sample (transmit sample) is moved to an input of the power amplifier 45. By means of the feed-back of the output to the input of the register it is possible to carry out the scroll cycle for as long as desired.

The transmit circuit just described according to the FIG. 10 is preferred since it consists predominantly of relatively economical digital components, and since it permits a flexible conformation of the frequency spectrum of the transmit pulses by means of relatively simple variations of the operational parameters. For the production of the transmit pulses however, in place of the transmitter circuit according to FIG. 10, a transmission circuit according to FIG. 13 can be employed, which substantially consists of a modulator with amplitude modulation, an electronic switch and a power amplifier.

Figure 13:
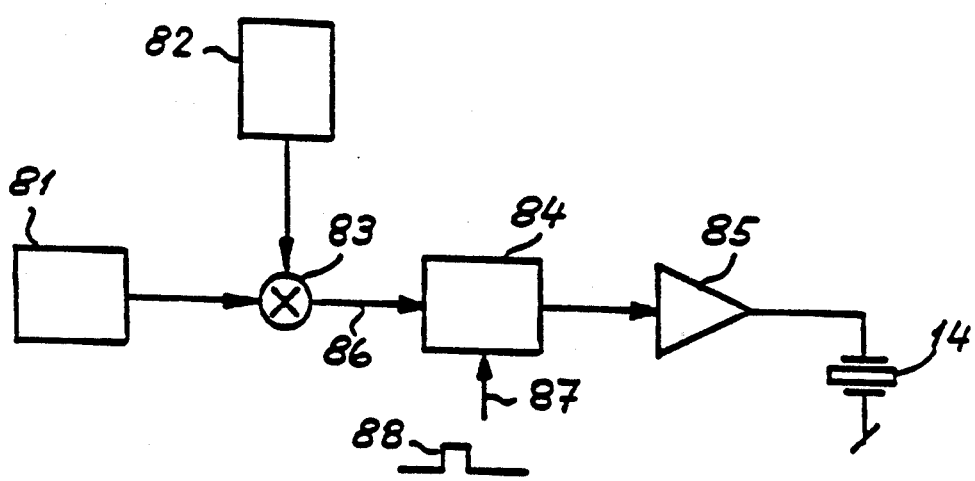
FIG. 13 is a block diagram of a second embodiment of the transmitter 15 in FIG. 7.
Figure 14:
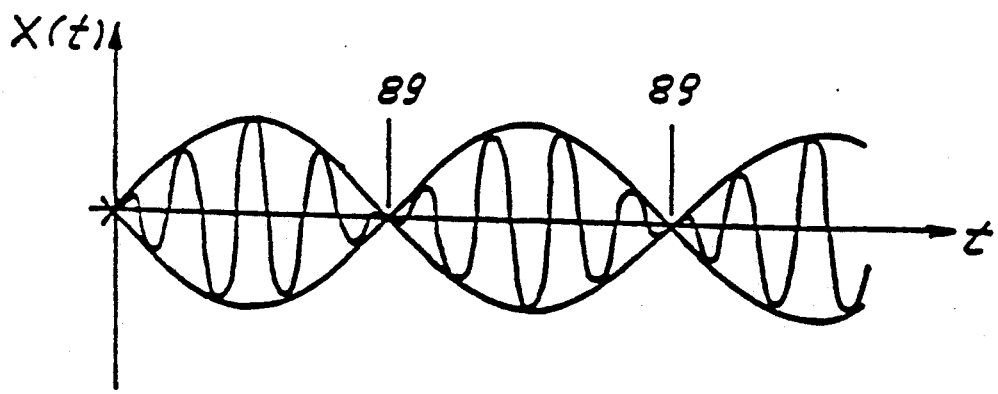
FIG. 14 is a diagram of the input signal of the gate circuit 84 in FIG. 13.

The transmit circuit according to FIG. 13 contains following functional analogic groups: a carrier frequency oscillator 81, which produces a carrier signal of frequency $F_0$, a modulation frequency oscillator 82 which produces a modulation signal with the frequency $f_m = \Delta f/2$, in which in the present example $f_m = 250$ kHz. The transmitter circuit according to FIG. 10 contains a multiplier 83, a pilotable electronic gate circuit 84 and a power amplifier 85 of which the output is connected to the ultrasonic transducer 14 in FIG. 7. With the multiplier 83 the carrier signal supplied by the oscillator 81 is multiplied by the modulation signal produced by the oscillator 82 to obtain an output signal which is represented in FIG. 14. As can be seen from FIG. 14, the amplitude modulated signal produced in this manner is the result of a conventional amplitude modulation. This amplitude modulated signal is fed by means of a line 86 to the input of the gate circuit 84. A pulse 88 which is supplied by the central control unit 17 in FIG. 7, is fed by means of a line 87 to a second input of the gate circuit to allow the amplitude modulated signal to pass to the input of the gate circuit 84 at set time intervals. In this manner transmit pulses are produced with after an amplification in the power amplifier 85 are fed to the ultrasonic transducer 14. The duration of the pulse 88 in FIG. 13 determines the duration of the transmit pulse.

It can be seen from FIG. 14 that the waveform produced by the amplitude modulation at the input of the gate circuit 84 has points of periodic phase inversion 89. By means of suitable time relationships between the pulse 88 in FIG. 13 and the signals supplied by the oscillators 81 or 82 the transmit pulses produced by the output of the gate circuit 84 contain one such point of inversion of phase 89. In this way (as in the case of the transmit pulses according to FIG. 9), one ensures that the transmit pulses fed to the ultrasonic transducer have a frequency spectrum according to FIG. 8.

I claim:

1. A Doppler flow velocity meter for measuring the flow velocity of a fluid carrying particles which reflect ultrasonic waves, comprising:

(a) an ultrasonic transducer for irradiating the fluid with ultrasonic wave pulses according to corresponding transmit pulses at a predetermined pulse repetition frequency, to receive echo waves reflected by the particles in the fluid and to emit corresponding echo signals;

(b) a transmitter connected to said ultrasonic transducer for generating transmit pulses having a spectrum of two adjacent but separate frequency bands with which the ultrasonic transducer is excited to transmit the ultrasonic wave pulses;

(c) a receiver connected to said ultrasonic transducer for receiving and processing echo signals which correspond to at least two different echo waves reflected by the particles at a set point of the flow path in response to first and second transmitted pulses, in which the adjacent but separate frequency bands are each processed in a separated signal processing channel;

(d) an evaluator connected to the output of the receiver, with which the output signal corresponding to the flow velocity is derived from the Doppler information obtained with the receiver;

(e) the receiver further includes:

(e.1) means in each of the signal processing channels for carrying out a quadrature demodulation of the echo signals received from the ultrasonic transducer in each of the frequency bands and for outputting quadrature signals, each defining a complex measured value $(P(0), P(\Delta t), P(2\Delta t), \ldots)$;

(e.2) Means for processing the quadrature signals from the two signal channels and means for producing a first output signal which corresponds to an average value of flow velocity at said set point of the flow path;

(e.3) Means for correlating said first output signal with said quadrature signals at the output of one of the signal processing channels for producing complex correlated values $(P(\Delta t/2), P(3\Delta t/2), \ldots)$; and (e.4) Means for evaluating a signal sequence corresponding to said complex measured values and said correlated values $(P(0), P(\Delta t/2), P(\Delta t), P(3\Delta t/2), P(2\Delta t), \ldots)$ and obtaining the instantaneous value of the flow velocity.

2. A Doppler flow velocity meter according to claim 1 wherein the transmitter further includes means for analyzing a signal sequence corresponding to complex measured and correlated values $(P(0), P(\Delta t/2), P(\Delta t), P(3\Delta t/2), P(2\Delta t), \ldots)$, and for producing a second output signal, the amplitude of which corresponds to the phase variations of a signal sequence, and thus corresponds to the instantaneous value of the flow velocity.

3. A Doppler flow velocity meter according to claim 2, wherein said means for analyzing includes means for carrying out a Fourier transformation.

4. A Doppler flow velocity meter according to claim 3, wherein said means for carrying out a Fourier transform includes transformation of the information contained in a certain number of echo signals is taken into account which is greater than the number of echo signals of which the information is considered for the calculation of the average value of the flow velocity.

5. A Doppler flow velocity meter according to claim 1, wherein the signal sequence which are composed of signals corresponding to the measured and correlated values includes shorter time distances than the signals which correspond to the measured values.

6. A Doppler flow velocity meter according to claim 1, wherein said means for producing the first output signal includes means for calculating the average value of flow velocity based on the information contained in 4 to 8 echo signals.

7. A Doppler flow velocity meter according to claim 1, further including means for reproducing an acoustic version of the signal sequence.

8. A Doppler flow velocity meter according to claim 1, further including means for calculating a value between two subsequent values by interpolating the measured values.

9. A Doppler flow velocity meter according to claim 1, further including means for calculating values between two successive measured values by interpolation of the measured values.

* * * * *